US005179255A

United States Patent [19]

Yeh

[11] Patent Number: 5,179,255

[45] Date of Patent: Jan. 12, 1993

[54] BASEBALL BAT HAVING THE FUNCTIONS OF RESONATORS AND MICROPHONES

[76] Inventor: Peter S. Y. Yeh, 10th Fl. 97, Sec. 2, Nan Kang Rd., Taipei, Taiwan

[21] Appl. No.: 763,201

[22] Filed: Sep. 20, 1991

[51] Int. Cl.[5] ........................ G01K 11/00; A63B 59/06

[52] U.S. Cl. .................................... 181/182; 181/184; 181/190; 273/72 R; 446/416

[58] Field of Search ............... 181/152, 153, 158, 159, 181/160, 182, 184, 189, 192, 190; 273/67 R, 72 R, 25, 26 B; 446/416, 418, 421

[56] References Cited

U.S. PATENT DOCUMENTS

| | | | |
|---|---|---|---|
| 3,173,688 | 3/1965 | Green | 273/72 R |
| 5,127,870 | 7/1992 | Lin | 446/416 |

*Primary Examiner*—Michael L. Gellner
*Assistant Examiner*—Khanh Dang
*Attorney, Agent, or Firm*—Bacon & Thomas

[57] ABSTRACT

A baseball bat having the functions of resonators and microphones is designed to be hollow and has a receiver cup disposed at its inner top end in such a manner that a spring may be hooked to its bottom while the other end of the spring is hooked to a tuning bar fixed at an end cap fittedly adhered to the bottom end of the bat. Besides, a plurality of sound-amplifying holes are formed on the surface of the bat at proper positions. Whenever the bat is vibrated by external force, the spring inside it shall vibrate accordingly and the sound-wave so produced resonates within the hollow bat which serves as a resonance box. When the sound-wave passes through the sound-amplifying holes on the surface of the bat, a special striking tone shall be produced. Such special tone can be produced either when the bat stikes a ball or when the bat is purposely vibrated or waved. When speaking into the receiver cup, the wave of voice may be amplified through the resonance effect of the hollow bat. No battery is needed in this baseball bat to achieve the above said functions and therefore, no public pollution by waste batteries shall occur due to this bat.

2 Claims, 8 Drawing Sheets

BASEBALL BAT HAVING THE FUNCTIONS OF RESONATORS AND MICROPHONES

BACKGROUND OF THE INVENTION

The present invention relates to a baseball bat which has the functions of resonators and microphones. Due to its special design and structure, such baseball bat provides unique and interesting effect when it is in use. Moreover, it is a product tending to environment protection because it does not require any battery of which the disposal is now one of the pollution problems.

As we know, baseball is a very popular mass game. Since it allows many people to join the game at the same time, both the team members and the audience enjoy a high mood and happy air either in a formal or a friendly match. Most of the commercially available baseball-related products are for professional use and few or no of them is designed to give funny and recreational effect. The conventional baseball bat, for example, is generally divided into two types, namely, wooden bat and metal bat. The wooden bat is a solid bat and the metal bat is a hollow bat. Either a solid or a hollow bat, it can usually be used to strike the ball only. The monotone click from the bat when striking a ball can do nothing in creating an overall happy air in a friendly match held by communities or schools. It is therefore tried by the applicant to develop a baseball bat which can provide much more fun during a baseball game.

SUMMARY OF THE INVENTION

It is a primary object of the present invention to provide a hollow baseball bat inside which a receiver cup is provided at the top end while a spring connected to the bottom of the receiver cup extends to the internal bottom end of the bat; and a plurality of holes are formed on surface of the bat at adequate positions to permit sound to pass through there. When the bat strike a ball or is purposely vibrated, the spring shall produce vibrating sound-wave which further resonates inside the hollow bat, and a special vibrating note shall pass the sound-amplifying holes. Such special vibrating note can be produced either when the bat is used to strike a ball or when the bat is waved by the audience or cheer squad, thereby a particularly joyous and interesting effect is achieved. In addition, the receiver cup inside the bat can be used as a loud-speaker for field contact. In other words, the present invention provides a multi-function baseball bat which can be used to achieve specially joyous effect with its resonatory structural design and microphone capability in addition to its striking function.

Another object of the present invention is to provide a baseball bat which may produce sound resonance without using any battery and therefore, avoids from the hazards to environment protection caused by the waste batteries.

BRIEF DESCRIPTION OF THE DRAWINGS

The other objects and the technique, features, performance, etc. of the present invention can be clearly understood by referring to the following detailed description of preferred embodiment and the accompanying drawings wherein.

DETAILED DESCRIPTION OF THE PREFERRED EMBODIMENTS

Figure 1:
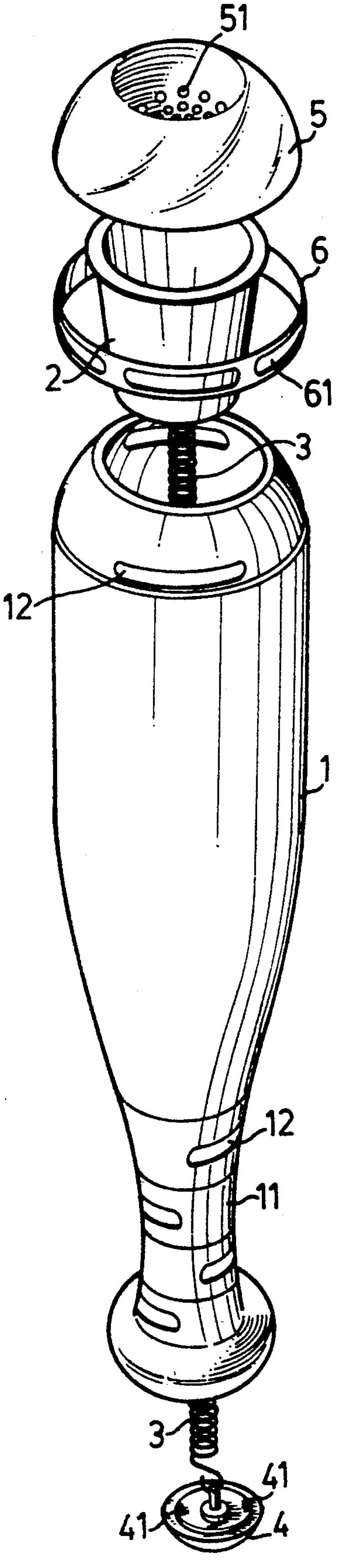
FIG. 1 is a three-dimensional analytical perspective of the present invention.

First, please refer to FIG. 1. The present invention provides a baseball bat which is designed by employing the resonance principle so that a special sound effect is achieved when the bat strikes a ball or is vibrated by external force. Meanwhile, the present invention can be used as a microphone or loud-speaker. In other words, the present invention has multiple functions and can provide more funs to the users. Since the present invention does not need any battery while it can have the effect similar to that provided by other similar powered appliances, it will not cause any environmental pollution through waste batteries.

Figure 2:
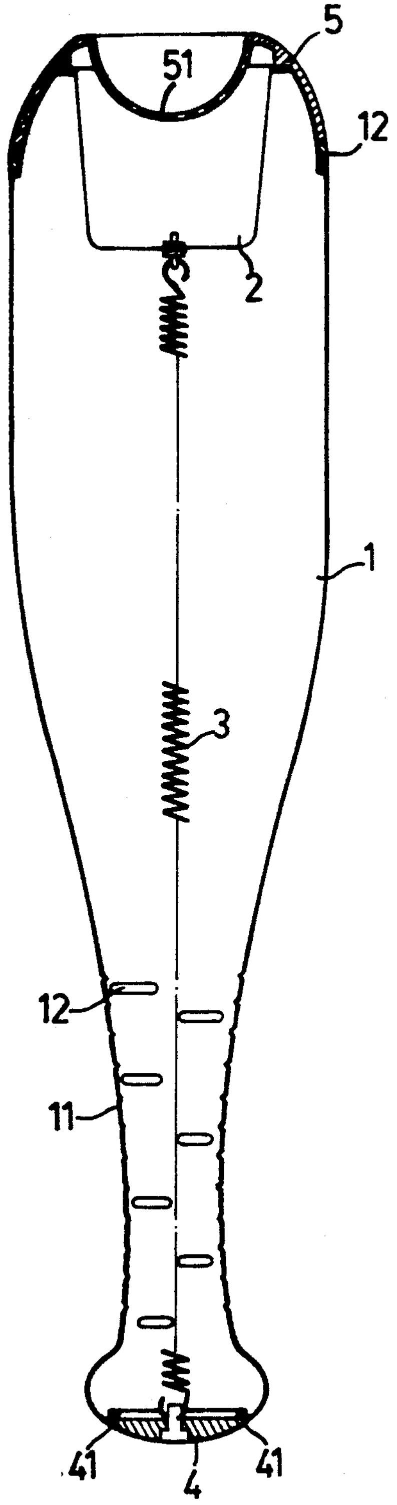
FIG. 2 is a vertical, sectional view of the present invention showing the internal assemblage.

Please further refer to FIGS. 1 and 2 for the structure of the present invention. The invention mainly includes a bat body 1, a receiver cup 2, a spring 3, an end cap 4, a receiver member 5, and a lashing ring 6. The bat body 1 is hollow and is made of plastic material with proper hardness and elasticity. A plurality of sound-amplifying holes 12 are formed on the bat body 1 at its handle section 11 permitting air to pass therethrough. Several sound-amplifying holes 12 are also formed on the bat body 1 near its top end permitting resulted resonant sound to a amplified through these upper sound-amplifying holes 12. The receiver cup 2 is located inside the bat body 1 near its top and has proper wall thickness. The spring 3 has adequate tension and has one end hooking to the bottom of the receiver cup 2 while the other end of its hooks to the end cap 4 at the lower end of the bat body 1. The end cap 4 is fitedly fixed to the bottom of the bat body 1 with suitable adhesive material. Two bulgy heads 41 are separately and oppositely provided at two inner sides of the end cap 4 corresponding to the surface of the bat body 1 so that a gap may exist between the end cap 4 and the end rim of the bat body 1. With this gap, the contact area of end cap 4 with the spring 3 is decreased, the vibration resistance to the spring 3 is reduced, and the vibrating sound effect from the spring 3 is enhanced. The receiver member 5 forms the top of the bat body 1 and is fixed to the bat body 1 with the lashing ring 6 as well as some suitable adhesive material. Through openings 61 are provided on the surface of the lashing ring 6 at positions corresponding to the sound-amplifying holes 12 on the upper portion of the bat body 1. A plurality of tiny holes 51 are formed on top of the receiver member 5 within area corresponding to upward opening of the receiver cup 2, permitting users to use the receiver member 5 as a loud-speaker by speaking into the receiver member 5 closely.

Figure 3:
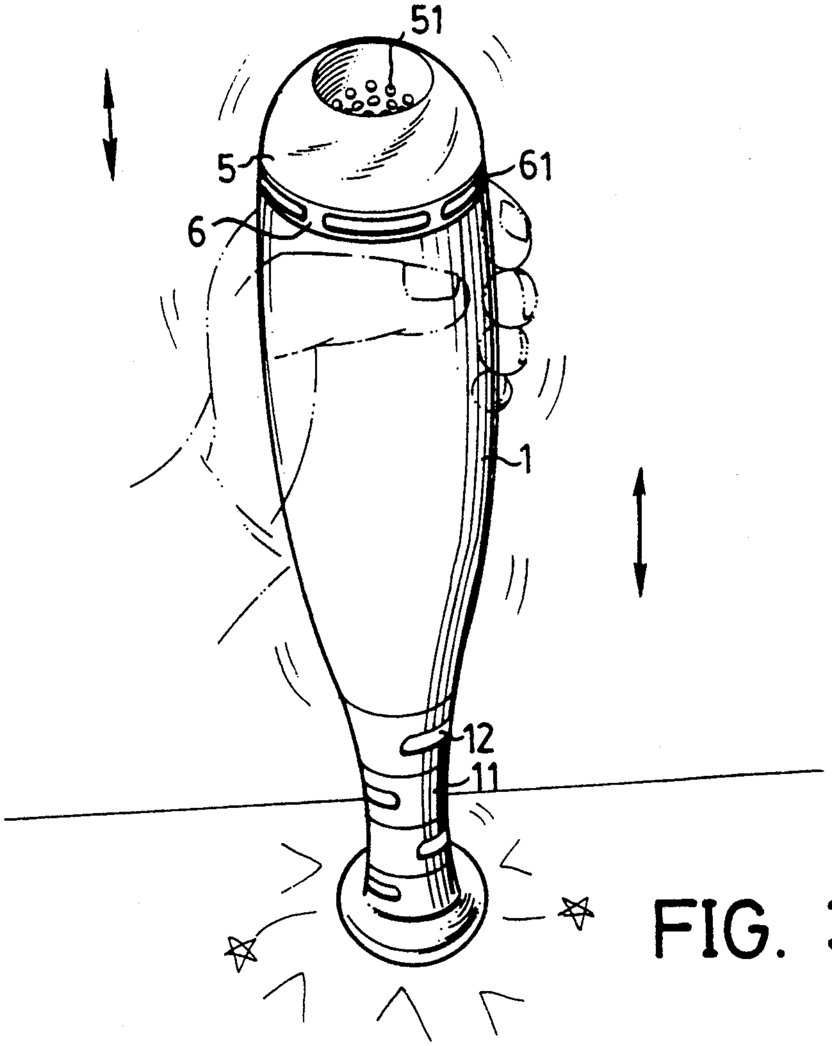
FIG. 3 illustrates the present invention being vibrated in up and down directions.
Figure 4:
FIG. 4 illustrates the present invention being waved by the cheer squad.
Figure 5:
FIG. 5 illustrates the present invention being used as a baseball bat.

Now, please refer to FIGS. 2 and 5. When the bat is vibrated by external force, the spring 3 connected between the receiver cup 2 and the end cap 4 shall be vibrated accordingly and generates sound inside the hollow bat body 1 which serves as a resonance box. The resonant sound is then amplified to give a special tone when it passes through the sound-amplifying holes 12 on the bat body 1. The hollow bat body 1 is virtually a resonance box and the spring 3 is virtually a sound source. The special sound effect the present invention provides is based on the physical effects these two components provide. Whenever the bat is used to strike a ball as shown in FIG. 5, to knock the ground as shown in FIG. 3, or to be upward and downward waved by the cheer squad as shown in FIG. 4, this special sound effect can be timely obtained to largely enhance the fun during the game.

Figure 6:
FIG. 6 illustrates the present invention being used as a loud-speaker.

FIGS. 4 through 6 illustrated some examples of the usage of the present invention. In FIG. 6, the user speaks into the receiver member 5, the sound wave of his voice vibrates the receiver cup 2 inside the bat body 1 and is amplified. The amplified sound-wave is further amplified through resonance while passes the hollow bat body 1. With this function, the baseball bat of the present invention can be used as a loudspeaker for field contact in the game.

Figure 7:
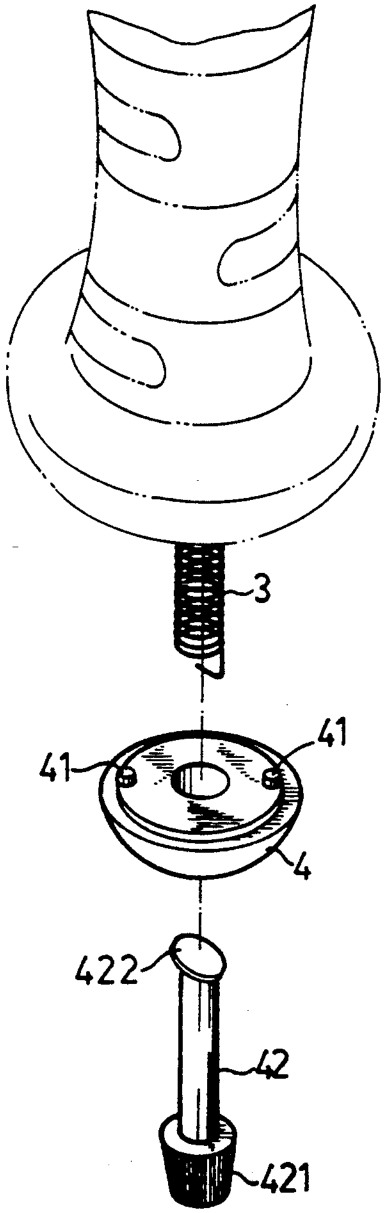
FIG. 7 is a three-dimensional analytical perspective illustrating the components of the present invention related to the tuning thereof.
Figure 9:
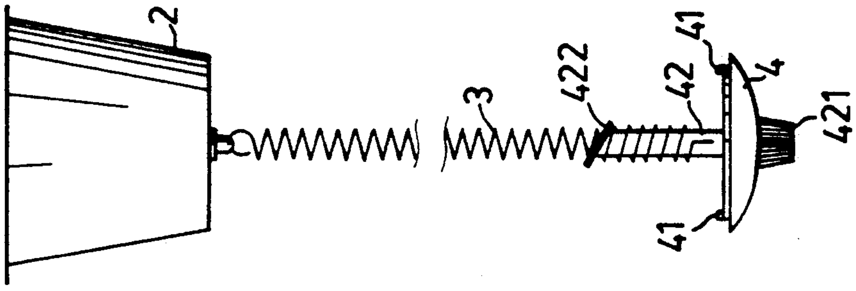
FIG. 9 illustrates another type of tuning of the present invention.
Figure 8:
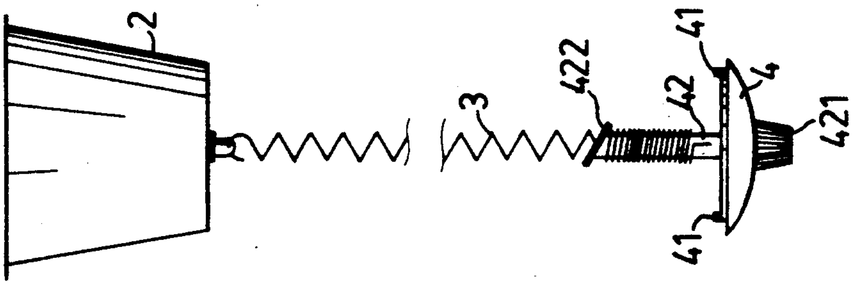
FIG. 8 illustrates a type of tuning of the present invention.

Please refer to FIG. 7. A tuning bar 42 extends through the center of the end cap 4 for adjusting the tension of spring 3 and thereby, changing the pitch of tone resulted from the vibration of the spring 3. A turnable adjusting knob 421 is provided at lower end of the tuning bar 42. The other end of the tuning bar 42 is designed to be an inclined flanged-disc 422. When the tuning bar 42 is turned, the inclinded flanged-disc 422 shall loosen or roll up the spring 3 following the pitch of spring 3 through helical effect, as shown in FIGS. 8 and 9. FIG. 8 illustrates the inclinded flanged-disc 422 of the tuning bar 42 rolling up and thereby, tightening the spring 3, and the frequency of the vibrating sound from the spring 3 at this time becomes higher, i.e. a tone of higher pitch is produced. FIG. 9, on the contrary, illustrates the spring 3 being loosened by the turnable adjusting knob 421 and thereby, producing sound of lower frequency. In brief, the tuning bar 42 may be adjusted according to actual need to change the frequency of sound produced by the spring 3.

It is to be understood that the form of the present invention shown and disclosed is to be taken as a preferred embodiment of the invention and that various changes in the shape, size, and arrangement of parts may be resorted to without departing from the spirit of the invention or the scope of the subjoined claims.

We claim:

1. A baseball bat having the functions of resonators and microphones comprising a bat body, a receiver cup, a spring, and end cap, a receiver member, and a lashing ring;

said bat body being designed to be hollow so as to serve as a resonance box and having a plurality of sound-amplifying holes formed at its handle part as well as at a place near its top end; through said sound-amplifying holes, resonant sound produced by said hollow bat body passing and being amplified;

said receiver cup being in form of a cup, having proper wall thickness, and being disposed at inner top of said hollow bat body while its bottom being connected with said spring of which the tension is properly adjustable;

said end cap being fittedly fixed to bottom end of said bat body with suitable adhesive material permitting another end of said spring to hook thereto; two bulgy heads being separately and oppositely formed at two inner sides of said end cap corresponding to end rim of said bat body in order for a gap to exist between said end cap and said bat body; and said receiver member being provided at top end of said bat body and fixed thereto with suitable adhesive material and said lashing ring; a plurality of openings being formed on said lashing ring at positions corresponding to said sound-amplifying holes near top end of said bat body; and a plurality of tiny holes being formed on top surface of said receiver member within area corresponding to upward opening of said receiver cup.

2. A baseball bat having the functions of resonators and microphones as claimed in claim 1 wherein a tuning bar is provided and downward extends through center of said end cap, a turnable adjusting knob is connected to lower end of said tuning bar and an inclined flanged-disc is formed on top of said tuning bar, said spring is able to be extended through by said tuning bar with it lower end hooked to the root of said tuning bar and thereby, said spring may be loosened or tightened to change its tension by turning said turnable adjusting knob, and said inclinded flanged-disc may follow the spring pitch to facilitate the loosening or rolling up said spring when the turnable adjusting knob is turned.

* * * * *